United States Patent
Massie

[15] 3,692,842
[45] Sept. 19, 1972

[54] HYDROXYLATION OF AROMATIC COMPOUNDS

[72] Inventor: Stephen N. Massie, 30 Algonquin Road, Des Plaines, Ill. 62516

[22] Filed: Feb. 12, 1971

[21] Appl. No.: 115,127

Related U.S. Application Data

[63] Continuation-in-part of Ser. No. 789,383, Jan. 6, 1969, abandoned.

[52] U.S. Cl. ........260/613 D, 260/621 G, 260/622 R, 260/623 R, 260/624 R, 260/625, 260/621 K, 260/620, 260/626 R, 260/619 A, 260/289 R, 260/429 R, 260/439 R, 252/431
[51] Int. Cl.................................................C07c 37/00
[58] Field of Search...................... 260/621 G, 613 D, 622 R, 623 R, 260/624 R, 625, 621 K, 620, 626 R, 619 A

[56] References Cited

UNITED STATES PATENTS

| | | | |
|---|---|---|---|
| 3,407,237 | 10/1968 | Vesely | 260/621 |
| 3,461,170 | 8/1969 | Schmerling | 260/613 |
| 3,481,989 | 12/1969 | Vesely | 260/613 |
| 3,580,956 | 5/1971 | Bloch | 260/621 |
| 3,600,446 | 8/1971 | Massie | 260/621 |
| 3,600,447 | 8/1971 | Vesely | 260/621 |

*Primary Examiner*—Bernard Helfin
*Attorney*—James R. Hoatson, Jr. and Raymond H. Nelson

[57] ABSTRACT

Nuclear hydroxylation of aromatic compounds is effected by treating an aromatic compound with hydrogen peroxide in the presence of a catalyst comprising a metal derivative of a phthalocyanine at hydroxylation conditions.

11 Claims, No Drawings

HYDROXYLATION OF AROMATIC COMPOUNDS

CROSS REFERENCE TO RELATED APPLICATION

This application is a continuation-in-part of my copending application Ser. No. 789,383, filed Jan. 6, 1969 and now abandoned.

This invention relates to a process for the nuclear hydroxylation of aromatic compounds. More particularly the invention is concerned with a process whereby one or more hydroxyl groups are introduced into the nucleus of an aromatic compound.

Hydroxylated aromatic compounds will find a wide variety of uses in the chemical field. For example, hydroquinone is an important chemical which is utilized for photographic developers, in dye intermediates, in medicine, as an antioxidant for fats and oils, as an inhibitor, in coating compounds, in paints and varnishes, as well as in motor fuels and oils. In addition, it is also used as an intermediate for preparing mono- and dibenzyl ethers of hydroquinone, the latter compounds being used as stabilizers, antioxidants, solvents, as well as being used in perfumes, plastics and pharmaceuticals. Likewise, the dihydroxylated benzene compound, catechol, may be used as an antiseptic, in photography, dye-stuffs, as an antioxidant or light stabilizer. Furthermore, catechol is used as an intermediate for the preparation of the dimethyl ether of catechol which is used as an antioxidant and for the preparation of the mono-methyl ether of catechol which is guaiacol, said guaiacol being an important component of many medicinal preparations.

Likewise, phenol and the cresols are used in phenolic resins, as disinfectants, flotation agents, surfactants, scouring compounds, lube oil additives, photographic developers, intermediates in ink, paint, and varnish removers, etc. In addition, hydroxy-substituted aromatic carbohydrate derivatives may be used as intermediates in detergents, water-soluble pharmaceuticals, explosives, gelling agents, surface coatings, resins and oxidative inhibitors.

It is therefore an object of this invention to provide a process for preparing hydroxylated aromatic compounds.

A further object of this invention is to provide a process for introducing hydrogen substituents into the nucleus of an aromatic compound utilizing certain catalystic compositions of matter to effect the hydroxylation.

In one aspect an embodiment of this invention is found in a process for the nuclear hydroxylation of an aromatic compound having the formula:

$$R_m Ar X_n$$

in which Ar is a monocyclic or polycyclic aromatic hydrocarbon nucleus, R is independently selected from the group consisting of n-alkyl, sec-alkyl, tert-alkyl, cycloalkyl, hydroxyl, alkoxyl, and hydroxy alkyl, X is selected from the group consisting of halogen and nitro, $m$ is 1 or 2 and $n$ is 0 or 1, which process comprises treating said aromatic compound with an aqueous hydrogen peroxide containing from about 5 to about 90 percent hydrogen peroxide, at a temperature of from about $-10°$ to about $100°$ C. and a pressure of from atmospheric to about 50 atmospheres sufficient to maintain a substantial portion of the reactants in the liquid phase, the mol ratio of said aromatic compound to hydrogen peroxide being in the range from about 3:1 to about 15:1, in the presence of a phthalocyanine catalyst selected from the group consisting of metal phthalocyanines, their sulfonated and carboxylated derivatives thereof, said metals being selected from the group consisting of cobalt, vanadium, manganese, iron, copper, nickel, molybdenum, chromium, and tungsten, and recovering the resultant hydroxylated aromatic compound.

A specific embodiment of this invention resides in a process for the nuclear hydroxylation of phenol which comprises treating phenol with hydrogen peroxide at a temperature in the range of from about $-10°$ to about $100°$ C. and a pressure in the range of from about atmospheric to about 50 atmospheres in the presence of a catalyst comprising cobalt phthalocyanine disulfonate, and recovering the catechol and hydroquinone.

Other objects and embodiments of this invention will be found in the following further detailed description thereof.

As hereinbefore set forth, the present invention is concerned with a process for introducing hydroxyl substituents into the ring of an aromatic compound, said hydroxylation being effected by treating an aromatic compound with hydrogen peroxide in the presence of certain catalytic compositions of matter comprising metal derivatives of phthalocyanine. The starting materials which may be utilized in the process of this invention comprise aromatic hydrocarbons and derivatives thereof. The term "aromatic compound" as used in the present specification and appended claims will refer to these hydrocarbons and derivatives thereof and will include primary, secondary, and tertiary substituted alkyl aromatic hydrocarbons such as toluene, o-xylene, m-xylene, p-xylene, ethylbenzene, n-propylbenzene, n-butylbenzene, n-pentylbenzene, cumene (isopropylbenzene), sec-butylbenzene, tert-butylbenzene, tert-pentylbenzene, etc., cyclopentylbenzene, cyclohexylbenzene, 1-methylnaphthalene, 2-methylnaphthalene, 1-ethylnaphthalene, 2-ethylnaphthalene, 1-isopropylnaphthalene, 2-isopropylnaphthalene, 1-tert-butylnaphthalene, 2-tert-butylnapthalene, 1,2-dimethylnaphthalene, 1,2-diethylnaphthalene, methylbiphenyl, ethylbiphenyl, etc.; hydroxy-substituted aromatic compounds such as phenol, hydroquinone, catechol, resorcinol, 1-hydroxynaphthalene, 2-hydroxynaphthalene, 1,2-dihydroxynapthalene, etc.; alkoxy-substituted aromatic compounds such as anisole, phenetol, n-propoxybenzene, o-methylanisole, m-methylanisole, p-methylanisole, m-ethylanisole, p-ethylanisole, o-methylphenetol, m-methylphenetol, p-methylphenetol, etc.; halo-alkyl aromatic compounds such as o-chlorotoluene, m-chlorotoluene, p-chlorotoluene, o-bromotoluene, m-bromotoluene, p-bromotoluene, o-chloroethylbenzene, m-chloroethylbenzene, p-chloroethylbenzene, o-bromoethylbenzene, m-bromoethylbenzene, p-bromoethylbenzene, 2-chloro-1-methylnaphthalene, 2-bromo-1-methylnaphthalene, 4-chloro-1methylnaphthalene, 4-bromo-1-methylnaphthalene, 2-chloro-1-ethylnaphthalene, 4-bromo-1-ethylnaphthalene, etc.; aromatic carbohydrate derivatives of aromatic compounds such as 1,1-diphenyl-1-desoxy-D-glucitol, 1,1-ditolyl-1-desoxy-D-glucitol, 1,1-bis-(p-isopropylphenyl)-1-desoxy-D-glucitol, 1,1-bis-(p-methoxyphenyl)-1-desoxy-D-glucitol, 1,1-bis(p-hydroxyphenyl)-1desoxy-D-glucitol, the corresponding aromatic derivatives of other hexoses (fructose, sorbose, tagatose, psicose, idose, gulose, talose), glycolaldehyde, trioses, tetraoses, pentoses, etc. It is to be understood that the aforementioned compounds are only representative of the type of aromatic hydrocarbons and derivatives thereof which may be utilized as starting materials in the hydroxylation process of the present invention and that said invention is not necessarily limited thereto.

Utilizable aromatic derivatives may be represented by the following generic formula:

in which Ar is a monocyclic or polycyclic aromatic hydrocarbon nucleus, R is independently selected from the group consisting of n-alkyl, sec-alkyl, tert-alkyl, cycloalkyl, hydroxyl, alkoxyl and hydroxy-alkyl radicals, X is independently selected from the group consisting of hydrogen, halogen and nitro substituents, and $m$ and $n$ are integers of at least 1.

It is also contemplated within the scope of this invention that heterocyclic compounds such as quinoline may be treated with hydrogen peroxide in the presence of hydrogen fluoride according to the process of this invention. While the aforementioned list of compounds discloses the presence of primary, secondary, and tertiary alkylated aromatic hydrocarbons as well as hydroxy and alkoxy substituted aromatic compounds, it has been found that unalkylated benzene derivatives including benzene, halobenzenes such as chlorobenzene, bromobenzene, etc., nitrobenzenes, etc., will usually react less substantially than the corresponding alkylated or hydroxylated derivatives and will yield a difficulty separatable mixture of polyhydroxy aromatic compounds and other derivatives thereof.

The process of this invention is effected by treating an aromatic compound of the type hereinbefore set forth in greater detail with hydrogen peroxide in the presence of a catalyst comprising a metal derivative of a phthalocyanine. The hydrogen peroxide may be present in an aqueous solution containing from about 5 up to about 90 percent or more hydrogen peroxide. The preferred hydrogen peroxide solution will contain from about 30 to about 50 percent or higher concentrations of hydrogen peroxide inasmuch as when utilizing a lesser amount, the aqueous portion of the solution will tend to effect the recovery of the desired product by making said recovery more difficult. The hydroxylation conditions under which the present process of treating an aromatic compound with hydrogen peroxide is effected will include temperatures ranging from −10° up to about 100° C. or more, the preferred temperatures being those in a range of from ambient (about 25° C.) to about 75° C. In addition, the reaction pressure which is utilized will preferably be atmospheric in nature, although it is contemplated that somewhat higher pressures up to about 50 atmospheres may be used, the pressure being that which is necessary to maintain a substantial portion of the reactants in the liquid phase. When superatmospheric pressures are utilized, the pressures will be provided for by the introduction of a substantially inert gas such as nitrogen into the reaction zone.

Examples of catalytic compositions of matter which are used to effect the hydroxylation of aromatic compounds with hydrogen peroxide will comprise a derivative, and particularly a metal derivative of a phthalocyanine. Any suitable phthalocyanine catalyst may be used in the present invention and preferably comprises a metal phthalocyanine. Particularly preferred metal phthalocyanines include cobalt phthalocyanine and vanadium phthalocyanine. Other metal phthalocyanines which may be utilized as catalysts in the presence of this invention will include manganese phthalocyanine, iron phthalocyanine, copper phthalocyanine, nickel phthalocyanine, molybdenum phthalocyanine, chromium phthalocyanine, tungsten phthalocyanine, etc. However, in most cases a derivative of a phthalocyanine is preferred, a particularly preferred derivative being a sulfonate derivative. Thus, a particularly preferred phthalocyanine catalyst is cobalt phthalocyanine disulfonate. However, for increased solubility in neutral and acidic solutions, the trisulfonate or tetrasulfonate is preferred. It is understood that the disulfonate or mixtures of the di- and trisulfonates, as well as more highly sulfonated derivatives including, for example, cobalt phthalocyanine tetrasulfonate, may be used. Thus, the preferred compounds for use in the present invention comprise cobalt phthalocyanine trisulfonate, cobalt phthalocyanine tetrasulfonate, vanadium phthalocyanine trisulfonate, vanadium phthalocyanine tetrasulfonate, etc., or mixtures of these with the corresponding disulfonates. These compounds may be obtained from any suitable source or may be prepared in any suitable manner as, for example, by reacting cobalt or vanadium phthalocyanine with 25–50 percent fuming sulfuric acid. While the sulfonic acid derivatives are preferred, it is understood that other suitable derivatives may be employed.

Other derivatives of the metal phthalocyanines which may be utilized as catalysts include, in particular, the carboxylated derivatives which may be prepared, for example, by the action of trichloroacetic acid on the metal phthalocyanine or by the action of phosgene and aluminum chloride, on the metal phthalocyanine. In the latter reaction, the acid chloride of the metal phthalocyanine is formed, said acid chloride then being converted to the desired carboxylated derivative by conventional means such as hydrolysis which is well-known in the art. Some specific examples of these carboxylated derivatives of the metal phthalocyanines will include cobalt phthalocyanine dicarboxylate, cobalt phthalocyanine tricarboxylate, cobalt phthalocyanine tetracarboxylate, vanadium phthalocyanine dicarboxylate, vanadium Phthalocyanine tricarboxylate, vanadium tetracarboxylate, manganese phthalocyanine dicarboxylate, manganese phthalocyanine tricarboxylate, manganese phthalocyanine tetracarboxylate, iron phthalocyanine dicarboxylate, iron phthalocyanine tricarboxylate, iron phthalocyanine tetracarboxylate, copper phthalocyanine dicarboxylate, copper phthalocyanine tricarboxylate, copper phthalocyanine tetracarboxylate, nickel phthalocyanine dicarboxylate, nickel phthalocyanine tricarboxylate, nickel phthalocyanine tetracarboxylate, molybdenum phthalocyanine dicarboxylate, molybdenum phthalocyanine tricarboxylate, molybdenum phthalocyanine tetracarboxylate, chronium phthalocyanine dicarboxylate, chromium phthalocyanine tricarboxylate, chromium phthalocyanine tetracarboxylate, tungsten phthalocyanine dicarboxylate, tungsten phthalocyanine tricarboxylate, tungsten phthalocyanine tetracarboxylate, etc.

In one embodiment of the invention, the phthalocyanine catalyst is employed as an aqueous solution. In another embodiment the phthalocyanine catalyst is disposed on a suitable solid carrier and utilized as a fixed bed. Any suitable carrier may be employed. Charcoal is particularly preferred and includes, for example, bone char, wood charcoal, charcoal made from coconut or other nut shells, fruit pits, etc. Other solid carriers include alumina, silica, magnesia, thoria, zinc oxide, etc., as well as naturally occuring ores such as bauxite, diaspore, diatomaceous earth, kaolin, kieselguhr, etc., preferably being treated by washing, acid and/or caustic, etc., to at least partially purify the same. The phthalocyanine catalyst may be disposed on the solid carrier in any suitable manner including soaking, suspending, dipping, immersing, etc., of particles of the solid carrier in a solution of the phthalocyanine catalyst or by spraying, pouring or otherwise contacting the solution of the catalyst with the solid particles.

In yet another embodiment, the catalytic composition of matter when utilized as a metal phthalocyanine carboxylate or phthalocyanine sulfonate may be solubilized by forming a salt of the carboxylate, polycarboxylate, sulfonate, or polysulfonate derivative. This solubilization of the metal phthalocyanine complex is effected utilizing an amine of preferably an amine containing from six to 20 carbon atoms. Some specific examples of these alkyl amines include hexyl amine, heptyl amine, octyl amine, nonyl amine, decyl amine, undecyl amine, dodecyl amine, tridecyl amine, tetradecyl amine, pentadecyl amine, hexadecyl amine, heptadecyl amine, octadecyl amine, nonadecyl amine, eicosyl amine, the alkyl chains of the amine being either normal or branched chain in configuration.

It is also contemplated within the scope of this invention that the aromatic compound which is treated with hydrogen peroxide to undergo nuclear hydroxylation thereof may have this hydroxylation reaction effected in the presence of catalytic compositions of matter which may be described as metal porphyrins, the particularly preferred porphyrin catalysts are cobalt porphyrin and vanadium porphyrin. Other metal porphyrins which may be used include iron prophyrin, manganese porphyrin, chromium porphyrin, magnesium porphyrin, copper porphyrin, nickel porphyrin, zinc porphyrin, titanium porphyrin, tin porphyrin, lead prophyrin, tantalum porphyrin, antimony porphyrin, bismuth porphyrin, molybdenum porphyrin, palladium porphyrin, platinum porphyrin, silver porphyrin, mercury porphyrin, etc., although not necessarily with the equivalents results.

The amount of aromatic compound which is treated with the hydrogen peroxide in the presence of a metal derivative of a phthalocyanine will determine whether a mono-hydroxylated aromatic compound or a polyhydroxylated compound will be obtained. For example, if a mono-hydroxylated aromatic compound is desired, an excess of this reactant, namely, the aromatic compound, will be used. Conversely speaking, if a polyhydroxylated aromatic compound is to be the desired product, the relative amount of hydrogen peroxide which is used to treat the aromatic compound will be increased. Generally speaking, the aromatic compound will be in a mol ratio in a range of from about 3:1 to about 15:1 mols of aromatic compound per mol of hydrogen peroxide, although greater or lesser amounts of aromatic compound may also be used, the amount which is used depending, as hereinbefore set forth, as to whether the desired product is to be mono-hydroxylated or polyhydroxylated.

The process of the present invention which comprises the preparation of a hydroxylated aromatic compound may be effected in either a continuous or batch type operation. For example, when a batch type operation is used, a quantity of the aromatic compound is placed in an appropriate apparatus such as a flask which is provided with cooling or heating means, stirring means, etc., or an autoclave, along with the catalyst comprising the metal derivative of a phthalocyanine. The hydrogen peroxide is added thereto over a relatively long period of time, the addition usually being accomplished by adding the hydrogen peroxide dropwise while maintaining the apparatus at the proper operating conditions of temperature and pressure. Upon completion of the addition of the hydrogen peroxide reactant, the reaction is allowed to proceed for a predetermined residence time, said residence time varying from about 0.5 up to about 5 hours or more in duration. Upon completion of the desired residence time, the reaction product is recovered, separated from the catalyst, which may be in liquid or solid form, and subjected to conventional means of purification and recovery, said means including washing the product with an inert organic solvent, flashing off the solvent and subjecting the reaction product to fractional distillation in order to recover the desired hydroxylated aromatic compound.

It is also contemplated within the scope of this invention that the process for obtaining a hydroxylated aromatic compound may be effected in a continuous manner of operation. When such a type of operation is used, the aromatic compound which is to undergo hydroxylation is continuously charged to a reaction zone which is maintained at the proper operating conditions of temperature and pressure, said reaction zone also containing the catalyst comprising the metal derivative of a phthalocyanine. In addition, the hydrogen peroxide in the form of an aqueous solution containing from 5 up to about 90 percent or more hydrogen peroxide is continuously charged to the reaction zone in a slow and deliberate manner. The reaction is allowed to proceed for a predetermined residence time, following which the reactor effluent is continuously withdrawn. The reaction product is separated from the unreacted aromatic compound by conventional means and recovered, the unreacted aromatic compound then being recycled to form a portion of the feed stock. When the catalyst comprising a metal derivative of phthalocyanine is in solid form, the aromatic compound and the hydrogen peroxide may be passed through the catalyst which is positioned as a fixed bed in the reaction zone. Alternatively speaking, the reaction may also be effected in a moving bed type of operation in which the catalyst and the reactants pass through the reaction zone either concurrently or countercurrently to each other. In the preferred embodiment of the invention, the metal derivative of the phthalocyanine is utilized in insoluble form rather than in soluble form.

Examples of hydroxylated aromatic compounds which may be prepared according to the process of this invention include o-hydroxytoluene (o-cresol), p-hydroxytoluene (p-cresol), 2-hydroxy-p-xylene, 4-hydroxy-o-xylene, 2-hydroxyethylbenzene (o-ethylphenol), 2,4-dihydroxyethylbenzene, 2-hydroxy-p-cumene, 2-hydroxy-1-methylnaphthalene, 2,4-dihydroxy-1-methylnaphthalene 1-hydroxy-2-methylnaphthalene, 1,4-dihydroxy-2-methylnaphthalene, 2-hydroxy-1-methylanthracene, 2,4-dihydroxy-1-methylanthracene, catechol, hydroquinone, resorcinol, hydroxyhydroquinone, pyrogallol, guaiacol, 2-hydroxyphenetol, 2,4-dihydroxyanisole, 2,4-dihydroxyphenetol, 2-hydroxy-p-methylanisole,2-hydroxy-p-ethylanisole, 2-hydroxy-o-chlorotoluene, 2-hydroxy-o-bromotoluene, 4-hydroxy-o-chlorotoluene, 4-hydroxy-o-bromotoluene, 5-hydroxy-o-chlorotoluene, 5-hydroxy-o-bromotoluene, 1,1-di-(p-hydroxyphenyl)-1-desoxy-D-glucitol, 1,1-di-(p-hydroxyphenyl)-1-desoxy-D-mannitol, etc. It is to be understood that the aforementioned compounds are only representative of the class of hydroxylated aromatic compounds which may be prepared and that the present invention is not necessarily limited thereto.

The following examples are given to illustrate the process of the present invention which, however, are not intended to limit the generally broad scope of the present invention in strict accordance therewith.

EXAMPLE I

In this example a solution of 50 cc. of water, 14.1 g. (0.15 mol) of phenol, and 0.3 g. of cobalt phthalocyanine disulfonate was placed in a flask provided with stirring means. The flask was vigorously stirred at room temperature while 11.3 g. (0.1 mol) of 30 percent hydrogen peroxide solution was slowly added dropwise over a period of 0.5 hours. Upon completion of the addition of the hydrogen peroxide, the solution was stirred for an additional period of 1 hour. At the end of this time, the reaction product was recovered, separated from the aqueous layer and the catalyst, and subjected to analysis. There was obtained a 32 percent yield of polyhydroxylated benzene comprising catechol and hydroquinone, said yield being based on the hydrogen peroxide which was charged to the reactor.

EXAMPLE II

A solution of 50 cc. of water and 16.2 g. (0.15 mol) of anisole is placed in a flask provided with heating and stirring means, said flask also containing 0.3 g. of a catalyst comprising vanadium phthalocyanine disulfonate. To this solution is added 11.3 g. (0.1 mol) of a 30 percent hydrogen peroxide solution, said solution being added dropwise during a period of 0.5 hours. At the end of this addition period, the contents of the flask are stirred for an additional period of 1 hour. At the end of this time, the reaction product is recovered from the vessel, the reaction mixture is separated from the catalyst and water and subjected to fractional distillation under reduced pressure. The desired product comprising o-methoxyphenol and p-methoxyphenol is recovered.

EXAMPLE III

In this experiment, 53 g. (0.5 mol) of ethylbenzene along with 50 cc. of water and 0.3 g. of a cobalt phthalocyanine disulfonate catalyst is placed in an apparatus provided with heating and stirring means. The apparatus is heated to a temperature of about 60° C. and maintained thereat while 6.8 g. (0.1 mol) of 50 percent hydrogen peroxide solution is slowly added thereto in a dropwise manner, the addition being accompanied by vigorous stirring of the mixture. After the addition of the hydrogen peroxide is completed, said addition being accomplished during a period of 0.5 hour, heating is discontinued and the apparatus and contents thereof are allowed to return to room temperature, the contents being vigorously stirred for an additional period of 1 hour. At the end of this time, the reaction mixture is recovered, the product is separated from unreacted ethylbenzene, water, and catalyst, and recovered. Analysis of the desired product will disclose the presence of ethylphenol, ethylcatechol and ethylhydroquinone.

EXAMPLE IV

In this example 53 g. (0.5 mol) of m-xylene, 100 cc. of water, and 0.6 g. of a catalyst comprising vanadium phthalocyanine disulfonate is placed in a flask provided with stirring means. To this flask is added 6.8 g. (0.1 mol) of a 50 percent hydrogen peroxide solution, the addition of the hydrogen peroxide being effected dropwise over a period of 0.5 hour. The contents of the flask are vigorously stirred during the addition of the hydrogen peroxide and for an additional period of 2 hours. At the end of this time, the reaction mixture is recovered. The product is separated from unreacted m-xylene, water and catalyst. Analysis of the desired product will disclose the presence of 2,4-xylenol and 2,6-xylenol.

EXAMPLE V

To a mixture of 92 g. (1.0 mol) of toluene, 100 cc. of water, and 0.6 g. of cobalt phthalocyanine disulfonate is added 13.6 g. (0.2 mol) of a 50 percent hydrogen peroxide solution, the addition of the hydrogen peroxide being effected dropwise during a period of 0.5 hour. Upon completion of the addition of the hydrogen peroxide, the mixture is continued to be stirred for an additional period of 2 hours. Following this, the reaction mixture is recovered and the product is separated from water, the unreacted toluene, and catalyst. Analysis of the product by means of an infra-red apparatus will disclose the presence of a mixture of cresols.

EXAMPLE VI

A solution comprising 50 cc. of water, 140 g. of phenol and 0.3 g. of a catalyst comprising manganese phthalocyanine discarboxylate is placed in a flask provided with heating and stirring means. The mixture in the flask is vigorously stirred at room temperature, while 11 g. of a 30 percent hydrogen peroxide solution is slowly added dropwise over a period of 0.5 hours. Upon completion of the addition of the hydrogen peroxide, the solution in the flask is stirred for an additional period of 1 hour. At the end of this time, the reaction mixture is recovered, separated from the aqueous layer and the catalyst is subjected to fractional distillation under reduced pressure. The desired product comprising a mixture of catechol and hydroquinone is recovered therefrom.

EXAMPLE VII

In this example 0.5 g. of manganese phthalocyanine disulfonate is solubilized by admixing with 0.3 g. of n-decyl amine. The solution is then added to 18.8 g. (0.2 mol) of phenol in a glass flask provided with heating and stirring means. The solution in the flask is vigorously stirred at room temperature, while 0.2 mols of a 30 percent hydrogen peroxide is added dropwise during a period of 0.5 hours. At the end of the addition time, the contents of the flask are stirred for an additional period of 1 hour. Following the completion of the predetermined residence time, the reaction product is recovered from the vessel, separated from the catalyst and subjected to fractional distillation under reduced pressure whereby the desired product comprising catechol and hydroquinone is recovered therefrom.

EXAMPLE VIII

A charge stock comprising 16.2 g. (0.15 mol) of anisole is placed in a flask provided with heating and stirring means. In addition, a catalyst comprising 0.5 g. of cobalt phthalocyanine tetracarboxylate which has been solubilized in 1.2 g. of n-dodecylamine is also added thereto. The solution is vigorously stirred while adding 11.3 g. (0.1 mol) of a 30 percent hydrogen peroxide solution, the addition of the hydrogen peroxide being accomplished by a dropwise addition during a period of 0.5 hours. At the end of the hydrogen peroxide addition period, the solution is stirred for an additional 1 hour. Thereafter the reaction mixture is recovered from the vessel, the product is separated from the catalyst and subjected to fractional distillation under reduced pressure whereby the desired product comprising o-methoxyphenol and p-methoxyphenol are recovered.

I claim as my invention:

1. A process for the nuclear hydroxylation of an aromatic compound having the formula:

$$R_m Ar X_n$$

in which Ar is a monocyclic or polycyclic aromatic hydrocarbon nucleus, R is independently selected from the group consisting of n-alkyl, sec-alkyl, tert-alkyl, cycloalkyl, hydroxyl, alkoxyl, and hydroxy alkyl, X is selected from the group consisting of halogen and nitro, $m$ is 1 or 2 and $n$ is 0 or 1, which process comprises treating said aromatic compound with an aqueous hydrogen peroxide containing from about 5 to about 90 percent hydrogen peroxide, at a temperature of from about $-10°$ to about $100°$ C. and a pressure of from atmospheric to about 50 atmospheres sufficient to maintain a substantial portion of the reactants in the liquid phase, the mol ratio of said aromatic compound to hydrogen peroxide being in the range of from about 3:1 to about 15:1, in the presence of a phthalocyanine catalyst selected from the group consisting of metal phthalocyanines, their sulfonated and carboxylated derivatives thereof, said metals being selected from the group consisting of cobalt, vanadium, manganese, iron, copper, nickel, molybdenum, chromium, and tungsten, and recovering the resultant hydroxylated aromatic compound.

2. The process as set forth in claim 1 in which said hydroxylation conditions include a temperature in the range of from $-10°$ to about $100°$ C. and a pressure in the range of from atmospheric to about 50 atmospheres.

3. The process as set forth in claim 1 in which catalyst is manganese phthalocyanine.

4. The process as set forth in claim 1 in which said catalyst comprises cobalt phthalocyanine disulfonate.

5. The process as set forth in claim 1 in which said catalyst comprises vanadium phthalocyanine disulfonate.

6. The process as set forth in claim 1 in which said catalyst is manganese phthalocyanine dicarboxylate.

7. The process as set forth in claim 1 in which said aromatic compound is phenol and said hydroxylated aromatic compound is a mixture of catechol and hydroquinone.

8. The process as set forth in claim 1 in which said aromatic compound is toluene and said hydroxylated aromatic compound is a mixture of cresols.

9. The process as set forth in claim 1 in which said aromatic compound is anisole and said hydroxylated aromatic compound is a mixture of o-methoxyphenol and p-methoxyphenol.

10. The process as set forth in claim 1 in which said aromatic compound is m-xylene and said hydroxylated aromatic compound is a mixture of 2,4-xylenol and 2,6-xylenol.

11. The process as set forth in claim 1 in which said aromatic compound is ethylbenzene and said hydroxylated aromatic compound is a mixture of ethylphenol, ethylcatechol, and ethylhydroquinone.

* * * * *